United States Patent [19]

Durance et al.

[11] Patent Number: 5,676,989
[45] Date of Patent: Oct. 14, 1997

[54] PRODUCTION OF CHIPS

[75] Inventors: Timothy Douglas Durance; Fang Liu, both of British Columbia, Canada

[73] Assignee: The University of British Columbia, Vancouver, Canada

[21] Appl. No.: 625,082

[22] Filed: Mar. 29, 1996

[51] Int. Cl.$^6$ .................... A23L 1/00; H05B 6/00
[52] U.S. Cl. ................. 426/242; 426/243; 426/637
[58] Field of Search ..................... 426/241, 242, 426/243, 804, 808, 637

[56] References Cited

U.S. PATENT DOCUMENTS

| | | | |
|---|---|---|---|
| 4,283,426 | 8/1981 | Yuan et al. .................. | 426/637 |
| 5,049,711 | 9/1991 | August ........................ | 426/242 |
| 5,202,139 | 4/1993 | Gaon et al. .................. | 426/242 |
| 5,292,540 | 3/1994 | Laufer ......................... | 426/242 |
| 5,298,707 | 3/1994 | Sprecher et al. ............ | 426/243 |
| 5,312,631 | 5/1994 | Yamashita ................... | 426/808 |

*Primary Examiner*—George Yeung
*Attorney, Agent, or Firm*—C. A. Rowley

[57] ABSTRACT

A process of producing fat free chips cooks the chips and while at elevated temperature and containing sufficient moisture to form the desired pore structure in the chips subjects the chips to sub-atmospheric pressure to expand the moisture into stream and form small pores within the chip structure to provide a cooked fat free product have a similar texture and taste to that of convention deep fried chips.

21 Claims, 2 Drawing Sheets

PRODUCTION OF CHIPS

FIELD OF INVENTION

The present invention relates to a process and apparatus for producing substantially fat-free potato chips by cooking in a microwave field.

BACKGROUND

Traditional potato chips are produced by frying of potato slices in edible oil, usually vegetable oil. This cooking method provides high heating rates and high temperatures to the potato tissue during cooking. Heat causes hydration and expansion of starch granules in the potato, which the consumer experiences as cooked texture and flavor. Rapid heating also boils water out of the tissue, which gives a crisp but light and expanded material. Maillard browning reactions (see Whistler, R. I. and Daniel, J. R. 1985, Carbohydrates in "Food Chemistry" Second Edition, Marcel Dekker Inc. New York, Owen R. Fennema ed., pg. 96–105) between amino groups of amino acids and small amounts of sugars in the potato give the golden color and a toasted flavor which are characteristic of potato chips. Unfortunately, oil uptake by the potato during frying is inevitable, such that typically 60% of the caloric content of potato chips are from fat from the flying oils. This level of fat in a normal diet is far above the level recommended by health authorities.

Many attempts have been made to produce low-fat or no-fat potato chips, including baked chips, reformed and baked potato snacks, and microwave-dried chips (Specher, Weidersatz and Gaon,. U.S. Pat. Nos. 5,298,707 issued May 29, 1994; and Yuan et al., 4,283,425 issued Aug. 11, 1981. The method of Yuan et al. requires coating of the potato slices with protein and or fat prior to microwaving, in order to avoid a hard exterior crust on the chip. Microwave heating alone has been considered unsuitable for producing potato chips because of this hard exterior as described by Specher et at, 1994. The method of Specher et al, 1994 employs a special intermittent microwave field, provided by a meandering wave guide and a special conveyer belt to reduce the problem of hard surface and texture but this approach still produces a relatively dense, hard chip because the evaporation and diffusion of water out of the chip is not sufficiently rapid to puff or expand the structure of the potato tissue.

U.S. Pat. No. 5,312,631 issued May 17, 1994 to Yamashita teaches the use of a coating to prevent potatoes from sticking together and refers to the use of irradiating electromagnetic waves including microwaves and drying under below atmospheric pressure conditions

BRIEF DESCRIPTION OF THE INVENTION

It is the main object of the invention to provide a system of producing cooked substantially fat free potato chips having a crisp texture and good taste.

The present invention relates to a method and apparatus for producing substantially fat free expanded product in the form of chips comprising arranging sliced raw product pieces on a support, treating said raw product by a step of at least partially cooking said product to provide an at least partially cooked product substantially free of surface moisture but containing a first amount of unbound moisture within its structure and a further step of heating said at least partially cooked product by means of electromagnetic radiation to provide a heated cooked product containing unbound within its structure in a second amount of moisture sufficient to generate a desired pore structure in said expanded product, and then reducing the pressure surrounding said cooked product at a rate and to a pressure below atmosphere to flash moisture within said cooked product and form pores in said product and provide an expanded product, controlling conditions in said treating steps to provide said cooked heated product containing said second amount of moisture within its structure sufficient to expand said moisture as steam and produce the desired pore structure within said expanded product so that said expanded product has a texture that simulates the texture of a conventionally cooked product.

Preferably said at least partially cooking includes a step of surface drying said product just prior to said further step of heating said at least partially cooked product by means of electromagnetic radiation, said step of surface drying including heating at below atmospheric pressure while sweeping surfaces of said product with air to pick up surface moisture.

Preferably said second amount of moisture will comprise between 3 and 40% by weight of the cooked heated product.

Preferably said reducing pressure will reduce the pressure surrounding said product to less than 100 Torr preferably less than 80 Torr in less than 2 minutes preferably less than 1.7 minutes.

Preferably said cooked product will be at a temperature of between 70° and 90° C.

Preferably said electromagnetic radiation comprises microwaves

BRIEF DESCRIPTION OF THE DRAWINGS

Further features, objects and advantages will be apparent from the detailed description of the preferred embodiments of the present invention taken in conjunction with the accompanying drawings in which.

DESCRIPTION OF THE PREFERRED EMBODIMENT

The method of the present invention is suitable for the preparation of fat free potato chips and other vegetable snacks. Potato or other vegetable slices, which may be cut flat, ridged, or in a mesh pattern, but are generally thin in profile e.g. less than about 0.2 inches thick, preferably less than 0.15 inches thick are cooked, expanded, dried and browned to crisp snack portions. In this description, the term raw product slices shall mean cut potato or other fruits or vegetable slices to which the invention may be applied for example it is believed the invention may be applied to yams, sweet potatoes, apples, carrots or mushrooms and non-plant tissue food, such as fabricated foods (e.g. snack foods) fabricated from mixtures of flour, gain meals, etc.

The following description will deal primarily with potatoes, but it intend that the term potato be read where reasonable as any of the other similar vegetables that may be treated or processed to advantage using the present invention. It will be apparent that when a different fruit or vegetable is to be cooked to provide the fat free expanded product the conditions will have to be tuned to obtain the desired crispness and porosity in the expanded product.

Figure 1:
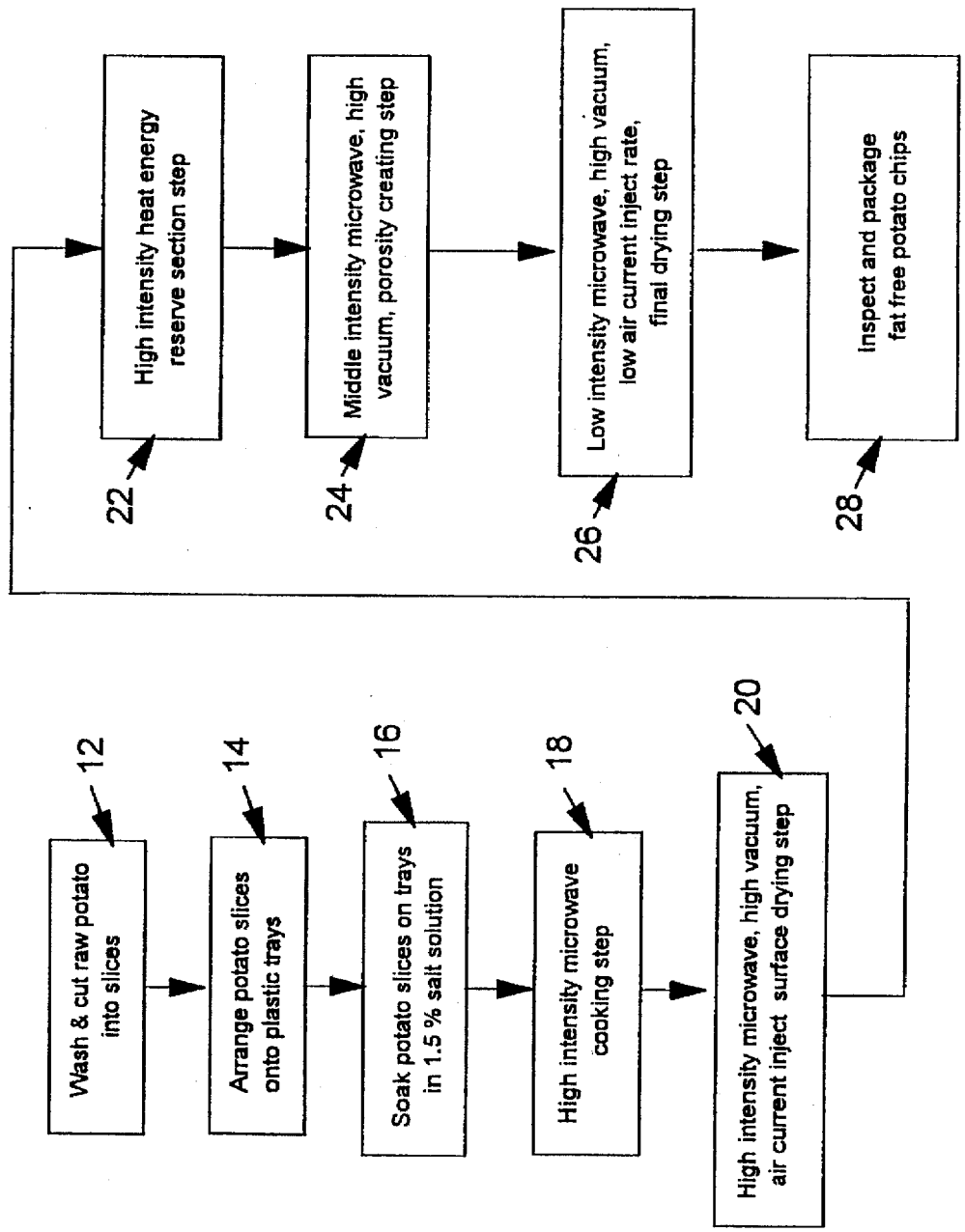
FIG. 1 is a flow chart of the method of the present invention.

FIG. 1, is a flow chart of the method of the present invention. As shown, initial preparation of raw potato slices includes the steps of washing the raw potato, which may or may not be peeled prior to slicing and then slicing into the desired shape as schematically shown at 12 in FIG. 1. A preferred shape of the raw product slices is the mesh shape, however other suitable conventional shapes including flat or crinkled, wavy etc. may be used.

The thickness of the potato slices is selected based on the desired thickness of the final product (chips). Typically, if the raw slices are about 0.11 inches thick and the dry potato chips are approximately 0.08 of an inch thick i.e. a shrinkage of more than about 25%. Obviously the greater the thickness the farther the moisture has to travel to reach the surface of the product and thus problems may be encountered if the slices are made too thick and the treating conditions will normally varied depending on slice thickness.

In carrying out the method of the invention raw slices or pieces are preferably placed on a suitable transport system such as trays as indicated at 14 in FIG. 1 and are preferably treated with seasoning as indicated at 16 such as salt (e.g. sodium chloride) for example by submerging in a 1.5 to 3% (weight) salt solution for about 15 to 25 minutes, preferably 20 minutes i.e. sufficient time for the potato slices to take up the desired amount of seasoning. Additionally, other spices or flavorings may be applied to the solution then mixed with the potato slices before the initial cooking step takes place, in order to flavor the final chips. Obviously the time and other conditions during the treatment step will be tuned to the specific product being treated and the ingredients with which the product is being treated.

It is believed that treatment of the raw potato with sodium chloride solution enhances microwave energy conversion to heat because dissolved salt increases of loss factor of raw potato slices.

After such treatment, the treated product is subjected to a cooking step as indicated at 18 which at least partially cooks the potatoes preferably using microwave energy (other energy sources may be used if they do not added fat nor deplete the moisture content of the potato too far). to raise the temperature of the potatoes to at least about 80° C. to cook the potato tissue, partially gelatinize starch granules within the tissue, remove the raw flavor of the potato, and soften the tissue to the point where it can be puffed or expanded as will be described below.. The time depends on the weight of raw potato slices in the chamber and microwave power density. After the cooking step, the potato slices have a soft texture, are no longer crisp or rigid and have lost their raw flavor.

If the potatoes are insufficiently cooked, the texture of the final product will be tough and hard, expansion of the tissue in later stages of the process will be insufficient for crisp texture and the flavor of the final potato chips will be similar to raw potato.

When a high (more than about 4 kW/kg of potato) intensity microwave field is applied as indicated for step 18 it is preferably selected to raise the temperature of the potatoes to about 80° C. in about 10 minutes, thereby to rapidly convert a major portion of the moisture within the potato slice into a heated vapor. While typically raw potato slices have a moisture content of approximately 80% by weight, the initial exposure of the potato slices to the high intensity microwave field at 18 applies sufficient heat to cook the chips to the required degree but without reducing the moisture content too much i.e. sufficient moisture will remain within the chip to carry out the following steps particularly expanding the chip in step 24 as will be described below. The moisture content leaving the step 18 will be greater than about 50% by weight of the wet chips, otherwise the chips have cooked too long.

As shown in the flow chart of FIG. 1, the at least partially cooked potato chips are preferably next subjected to a surface drying step as indicated at 20. The removal of any remaining surface moisture is preferably achieved by evaporation under below atmospheric pressure conditions and the use of air jets which spray dry air over the product i.e. the product is swept by air currents which pick up moisture from the surface of the product Air flow rates for these air currents in step 20 are preferably between about $1.4 \times 10^{-4}$ and $2.8 \times 10^{-4}$ $m^3$/kg.s fresh potato slices. Because a large amount of moisture escapes from the potato slices during exposure to the high intensity microwave field, the air injecting method preferably is used to minimize condensation within the chamber Such condensation would decrease the amount of microwave energy available for heating and drying potato slices because the condensate again absorbs microwave energy in the chamber, is vaporized and may again condense on the chamber wall. This is called the "heat pump effect" and it greatly reduces microwave energy usage efficiency and increases the processing time if not minimized or prevented.

The surface drying step 20 services to vaporizes a substantial portion of the tissue moisture and flushes the water vapor out of the chamber. It also serves to dry and partially seal the surface of the chip with dried potato starch, thereby allowing the subsequent expansion or porosity-creating step of the present invention.

Obviously heat is being applied in the stage 20 and when the cooking and drying steps 18 and 20 are carried out in the same closed vessel as described, the drying step in effect occurs during the latter stage of the cooking operation.

In the preferred embodiment of the present invention, total moisture content of the slices leaving the stage 20 is about preferably 20% to 30% by weight of the potato slice with a desired optimum of about 25%, however the moisture content may range from 70 to 5% and still achieve a significant portion of the desired result provided there is sufficient moisture within the product to swell and for the required pores.. The surface drying step 20 is carried out preferably at a pressure of about 80 to 120 Torr.

Surface drying step 20 is immediately followed, as shown in the flow chart of FIG. 1, by a high intensity energy reserve application step 22 wherein the at least partially cooked potato slices are exposed to a high intensity microwave field for a brief period of time to raise their temperature to at least about 70° C. within about 2 to 3 minutes and heat remaining moisture within the potato to approach, but preferably not to reach its boiling point. Diffusion of water vapor from the potato tissue is slowed because the surfaces of potato slices have formed barrier layers during the step 20. These barrier layers inhibit vapor escape from the slices.

The ambient pressure in the high energy reserve step 22 is about 760 Torr. The intensity of the microwave field and the duration of exposure is coordinated with the weight of raw potato slice to achieve the desired dehydration and heating The potatoes with a moisture content of at least sufficient to form the required pores (generally less than 40% but greater than 3% by weight) are then subjected to a porosity-creation step 24 wherein mid-intensity (e.g. about 2 kW/kg of potato) is applied to substantially prevent cooling and the pressure is decreased at a rate and to a pressure to cause moisture in the product to expand as steam and develop the desired pore structure in the potato. i.e. the pressure is reduce to a pressure of less that 100 Torr preferably less than 80 Torr in less than 2 minutes, preferably less than 1.7 minutes. The product leaving the porosity-creation step 24 will have a moisture content of less than 20% but higher than 3%, obviously some of the moisture within the product at the beginning of step 24 evaporated from the product to reduce the moisture content at least slightly in this step.

Water vapor and steam occupy a substantially greater volume than the same quantity of water in liquid form. The rapid conversion into steam of the water within the potato slice during the process thus has a desirable effect of causing the potato slice to puff up. Steam pressure generated within the slice cause the steam to quickly escape from the slice thereby increasing the roughness and surface porosity, facilitating further dehydration of the potato slice and roughening the outer texture to provide characteristics similar to those of traditionally deep fried potato chips.

Obviously any step requiring pressure and/or a controlled atmosphere other than atmospheric must be carried out in some form of closed container which in some stages must also contain microwaves when they are used. Where such conditions are not applied the potatoes need not be so contained.

The combined intense microwave heating in the energy reserve step 22 and rapid pressure drop in pressure the porosity-creating step 24 have the effect of puffing the slices and producing increased porosity and surface roughness.

After the porosity-creation step 24, the substantially dehydrated slices are finish-dried and browned to the desired color and texture preferably in a low microwave intensity (about 1 kW/kg potato), high vacuum (less than about 100 Torr), low air injection flow rate e.g. $1 \times 10^{-3}$ m$^3$/kg potato step 26. If desired, this final drying step 26 may alternatively be achieve using hot air drying at elevated temperature of about 55° C. and at atmospheric air pressure, but finish drying in a conventional air dryer or oven is slower. With either option after finish drying in step 26 the resultant product is a fat free chip having a moisture content of less than about 6% by weight i.e. generally between 0.5 to 9% preferably between 1 and 6% and most preferably about 1.5% for potatoes.

The chips are in this final form, are inspected and packaged as indicated at 28

The resultant chip product will normally have pores in the order of 0.1 mm. to 1 mm. in diameter and will simulate the texture and taste of conventional deep fried potato chips.

As above described flavoring agents may be added to the soak solution in step 16 prior to cooking in step 18, but they may also be applied to exterior surface of the potato slices after the surface drying step 20 or immediately before the final drying step 26.

The use of the preferred shape namely the net-screen cut form of potato reduces shrinkage of the gross dimensions of the cooked potato chip, which keeps nearly same dimensions as raw potato slice before drying. The net-screen form of the slices also reduces the total force required to bite into the chip and allows the processor to better achieve a desired balance between crispness and toughness of the chip.

Figure 2:
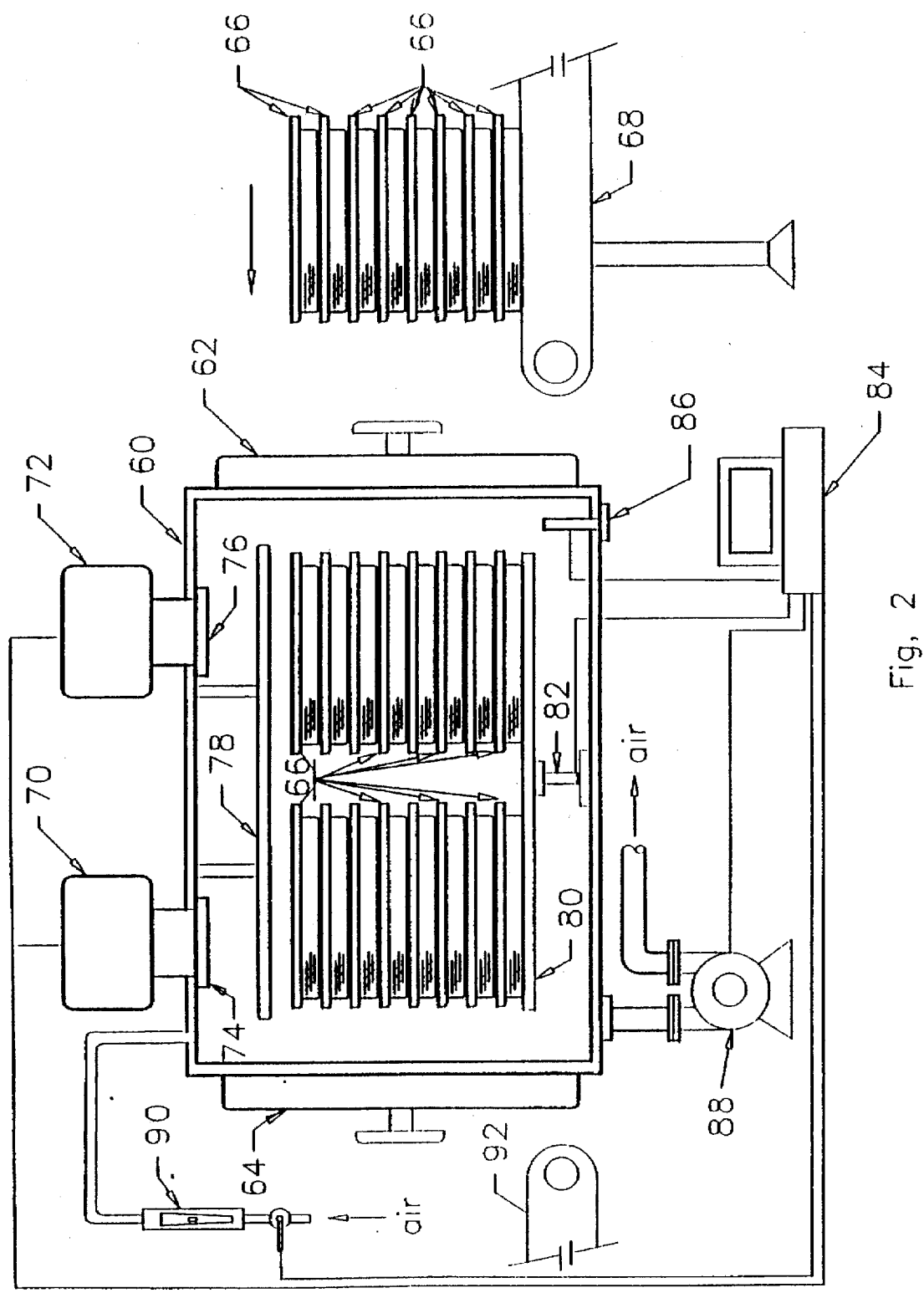
FIG. 2 is a diagram of one embodiment of the apparatus of the present invention.

Turning to FIG. 2 equipment for carrying out the process of the present invention is illustrated schematically. The equipment include a microwave and/or vacuum chamber 60 having an inlet door 62 and an outlet door. The sliced product in suitable containers (baskets) 66 is delivered to the chamber 60 via a conveyor 68. The baskets containing the product are introduced into the chamber 60 at the appropriate point in the process (depending on where microwave power is to be first applied) and are sealed within the chamber 60 for the application of energy, reduced pressure and seeping by air as described above.

The microwave energy is provided in the illustrated system by a pair of magnetrons 70 and 72 which inject the microwaves into the chamber 60 through sealing windows 74 and 76 respectively. preferably a waterproof plate 78 is interposed between the windows 74 and 76 and the baskets 66 within the chamber 60.

Two stacks of baskets 66 are shown supported within the chamber 60 on a support plate 80 that in mm is preferably supported by a suitable load cell 82 which measures the weight in the chamber 60 and delivers this information to the control computer 84.

Suitable temperature and pressure gauges schematically indicated at 86 measure the temperature and pressure in the chamber 60 and provide this information to the control computer 84

Below atmospheric pressure is applied by vacuum pump 88 controlled by computer 84 to reduce ambient pressure within the chamber at the appropriate times in the process and air is bled into the chamber 60 at the appropriate times under control of the flow meter 90 which in turn regulates the air flow based on the commands from the computer 84.

After completion to the operations to be carried out in the chamber 60 the baskets are removed through the door 64 and carried away via the conveyor 92.

EXAMPLE 1 (POTATO)

1.0 kilogram of raw potato (Brand Name: California New White Potato) with initial moisture content of 78% by weight are washed and sliced into the "mesh" shaped potato slices. The thickness of the mesh shaped slices is 0.11 inches. The potato slices are placed on the plastic trays and treated as indicated at 16 (FIG. 1) by submerging in a 2.0% by weight sodium chloride salt solution for 20 minutes. After treatment, the treated potato slices with trays are placed into the microwave vacuum dehydration system (MVD-4B) with total microwave power input of 4.0 kilowatts. Microwave absorption raises the temperature of the potato slices to about 80° C. for 7 minutes. After the cooking step 18, the potato slices have a soften moist texture and their raw flavor is lost. The moisture content of potato slices at the end of the cook step is 60% by weight.

After cooking step 18, the cooked potato slices are next subjected to a surface drying step as indicated at 20 in FIG. 1. The air injection flow rate is $2.8 \times 10^{-4}$ m$^3$/s with air temperature of 20° C. The chamber pressure in the surface drying step 20 is 120 Torr. The surface drying time is 6 minutes. At the end of the surface drying step, the moisture content of potato slices is 25% by weight.

In the high intensity energy reserve step 22 applied after surface drying step 20 the temperature of potato slices increases to 70° C. in 2 minutes. The ambient pressure in the high energy reserve step 22 is 760 Torr. The vapor loss from the potato tissue to chamber is slow in this step but still few percent are lost. The moisture content of potato slices at the end of the high energy reserve step 22 is 20% by weight.

The potato slices are subjected to a porosity-creation step 24 with 2.0 kilowatts total microwave power input. The rate of pressure drop in this step is 7.5 Torr/s. That means the pressure drops from atmospheric pressure (760 Torr) to 80 Torr in 1.5 minutes. The quick pressure drop causes steam puffing inside potato slices. The potato slices leave the porosity-creation step 24 with a moisture content of 7% by weight.

After the porosity-creation step 24, potato slices are finish-dried in the low intensity microwave drying step, i.e.

1.0 kilowatts total power input, with low air injection flow rate of $1.0 \times 1.0^{-3} m^3/s$ and high vacuum condition, 80 Torr. At the end of the finish drying in step 26, the fat free potato chips have 223 grams by weight with a moisture content of 3.0% by weight. The texture and taste of the so produced chips closely approaches those of conventional deep fried potatoes.

Having described the invention modifications will be evident to those skilled in the art without departing from the spirit of the invention as defined in the appended claims

We claim:

1. A method for producing substantially fat free expanded product in the form of chips comprising arranging product pieces on a support, treating said product pieces by a step of at least partially cooking said product to provide an at least partially cooked product substantially free of surface moisture but containing a first amount of unbound moisture within its structure and a further step of heating said at least partially cooked product by means of electromagnetic radiation to provide a heated cooked product containing within its structure unbound moisture in a second amount sufficient to generate a desired pore structure in said expanded product, and then in an pore forming stage reducing the pressure surrounding said heated cooked product at a rate and to a pressure below atmospheric to flash moisture within said heated cooked product and form pores in said product and provide an expanded product, controlling conditions in said step of at least partially cooking and said further step of heating to provide said heated cooked product containing said second amount of moisture within its structure sufficient to expand said moisture as steam and produce a desired pore structure within said expanded product so that said expanded product has a texture that simulates the texture of a conventionally cooked product.

2. A method as defined in claim 1 wherein said at least partially cooking includes a step of surface drying said product just prior to said further step of heating said at least partially cooked product by means of electromagnetic radiation, said step of surface drying including heating at below atmosphere pressure while sweeping surfaces of said product with air to pick up surface moisture.

3. A method as defined in claim 2 wherein heating at below atmospheric pressure applies energy via electromagnetic radiation.

4. A method as defined in claim 1 wherein said electromagnetic radiation comprises microwaves.

5. A method as defined in claim 2 wherein said electromagnetic radiation comprises microwaves.

6. A method as defined in claim 3 wherein said electromagnetic radiation comprises microwaves.

7. A method as defined in claim 1 whereto said second amount of moisture comprises between 3 and 40% by weight of the cooked heated product.

8. A method as defined in claim 2 wherein said second amount of moisture comprises between 3 and 40% by weight of the cooked heated product.

9. A method as defined in claim 3 wherein said second amount of moisture comprises between 3 and 40% by weight of the cooked heated product.

10. A method as defined in claim 4 wherein said second amount of moisture comprises between 3 and 40% by weight of the cooked heated product.

11. A method as defined in claim 5 wherein said second amount of moisture comprises between 3 and 40% by weight of the cooked heated product.

12. A method as defined in claim 6 wherein said second amount of moisture comprises between 3 and 40% by weight of the cooked heated product.

13. A method as defined in claim 2 wherein said step of reducing pressure reduces the pressure surrounding said product to less than 100 Torr in less than 2 minutes.

14. A method as defined in claim 3 wherein said step of reducing pressure reduces the pressure surrounding said product to less than 100 Torr. in less than 2 minutes.

15. A method as defined in claim 4 wherein said step of reducing pressure reduces the pressure surrounding said product to less than 80 Torr in less than 1.7 minutes.

16. A method as defined in claim 5 wherein said step of reducing pressure reduces the pressure surrounding said product to less than 80 Torr in less than 1.7 minutes.

17. A method as defined in claim 6 wherein said step of reducing pressure reduces the pressure surrounding said product to less than 80 Torr in less than 1.7 minutes.

18. A method as defined in claim 1 wherein said cooked product is at a temperature of between 70° and 90° C.

19. A method as defined in claim 2 wherein said cooked product is at a temperature of between 70° and 90° C.

20. A method as defined in claim 3 wherein said cooked product is at a temperature of between 70° and 90° C.

21. The method as defined in claim 1 wherein said product is a potato chip.

* * * * *